(12) United States Patent
Shi et al.

(10) Patent No.: US 12,337,543 B2
(45) Date of Patent: Jun. 24, 2025

(54) PRINTING METHOD FOR ADDITIVE MANUFACTURING, INCLUDING IN-SITU POWDER REGENERATION

(71) Applicant: Sakuu Corporation, San Jose, CA (US)

(72) Inventors: Steven Zhichao Shi, Santa Clara, CA (US); Morteza Vatani, Los Gatos, CA (US)

(73) Assignee: Sakuu Corporation, San Jose, CA (US)

( * ) Notice: Subject to any disclaimer, the term of this patent is extended or adjusted under 35 U.S.C. 154(b) by 432 days.

(21) Appl. No.: 18/154,783

(22) Filed: Jan. 13, 2023

(65) Prior Publication Data

US 2023/0226767 A1    Jul. 20, 2023

Related U.S. Application Data

(60) Provisional application No. 63/299,867, filed on Jan. 14, 2022.

(51) Int. Cl.
| | |
|---|---|
| *B29C 64/357* | (2017.01) |
| *B22F 10/14* | (2021.01) |
| *B22F 10/73* | (2021.01) |
| *B29C 64/165* | (2017.01) |
| *B33Y 10/00* | (2015.01) |
| *B33Y 30/00* | (2015.01) |
| *B33Y 40/00* | (2020.01) |

(52) U.S. Cl.
CPC ............ *B29C 64/357* (2017.08); *B22F 10/14* (2021.01); *B22F 10/73* (2021.01); *B29C 64/165* (2017.08); *B33Y 10/00* (2014.12); *B33Y 30/00* (2014.12); *B33Y 40/00* (2014.12)

(58) Field of Classification Search
CPC .................................................... B29C 64/357
See application file for complete search history.

(56) References Cited

U.S. PATENT DOCUMENTS

| | | | | |
|---|---|---|---|---|
| 5,354,414 | A | * | 10/1994 | Feygin .................... B22F 3/004 216/84 |
| 5,879,489 | A | | 3/1999 | Burns et al. |
| 11,370,166 | B2 | | 6/2022 | Swartz et al. |
| 2006/0219315 | A1 | | 10/2006 | Cox |
| 2018/0264732 | A1 | | 9/2018 | Swartz et al. |
| 2020/0016653 | A1 | | 1/2020 | Meacham |
| 2020/0298477 | A1 | | 9/2020 | Rogren |

(Continued)

FOREIGN PATENT DOCUMENTS

EP     3919260 A1    12/2021

OTHER PUBLICATIONS

International Search Report and Written Opinion issued Jun. 16, 2023 in corresponding PCT/US23/60769 filed Jan. 17, 2023—13 pages.

(Continued)

*Primary Examiner* — Xiao S Zhao
*Assistant Examiner* — Nicholas J Chidiac
(74) *Attorney, Agent, or Firm* — Arman Khosraviani

(57) ABSTRACT

An in-situ material regeneration method and system are provided that enable recovery, reconditioning and reuse of used build materials, including removed powder and removed liquids, thus increasing material utilization efficiency and reducing manufacturing costs.

23 Claims, 8 Drawing Sheets

(56) References Cited

U.S. PATENT DOCUMENTS

| | | |
|---|---|---|
| 2020/0368965 A1 | 11/2020 | Richards et al. |
| 2020/0398481 A1 | 12/2020 | Mantell et al. |
| 2021/0138730 A1 | 5/2021 | Budel |
| 2021/0197476 A1 | 7/2021 | Ewald |
| 2023/0211471 A1* | 7/2023 | Tanikella ................ B29C 64/40 51/297 |

OTHER PUBLICATIONS

International Search Report and Written Opinion issued Jun. 1, 2023 in related PCT/US23/60771 filed Jan. 17, 2023—15 pages.

* cited by examiner

PRINTING METHOD FOR ADDITIVE MANUFACTURING, INCLUDING IN-SITU POWDER REGENERATION

TECHNICAL FIELD AND BACKGROUND

The present disclosure pertains to an improved printing method and system for additive manufacturing (AM) process, including carrying out part of the process on a continuous substrate, and part of the process using segments of the substrate mounted on carrier frames. The present disclosure also pertains to an in-situ material regeneration method and system that enables recovery, reconditioning and reuse of used materials, such as powders and/or liquids collected from the AM process, thus increasing materials utilization efficiency and reducing manufacturing costs.

In typical AM operations, the layers are built on top of each other, or they are built on a conveyor belt, and at the last stage, they are stacked on each other. For example, in current binder jetting 3D printing, a powder layer of build material is deposited on a powder bed or a substrate followed by jetting a liquid binder onto the deposited powder layer to define the printed pattern. In this process, large amounts of excess, unbound build material powders are typically collected. The build material powder may be expensive, and, therefore, the collected used powder should preferably not be discarded as waste. Similarly, in an inkjet 3D printing or a jetted material 3D printing process, large amounts of used liquids such as solvents and inks may be collected and they cannot be discarded as wastes. However, regeneration of the used powder and/or liquids through external resources can increase both time and costs for manufacturing. Therefore, there is a need to provide an effective in-situ material regeneration system for collecting, reconditioning and reusing of the used powders and liquids. Also, there is a need to provide improved transport of layers of the powder through various stations individually, and to facilitate the removal of the layers of processed powder, after processing at the various stations, from a substrate they are mounted on to provide for improved stacking of the layers to build a multi-layer stack product.

SUMMARY OF THE INVENTION

In one implementation, a method including depositing powder on a substrate at a powder deposition station, removing a first portion of the powder and depositing the removed first portion of the powder in a first collection container, moving the powder remaining on the substrate to a wetting station, wetting the powder with a wetting agent at the wetting station, removing a second portion of the powder, after wetting, and depositing the removed second portion of the powder in a second collection container, moving the powder, after wetting and removal of the second portion, to a binder jetting station and depositing a binder to the powder at the binder jetting station, and removing a third portion of the powder, after depositing the binder, and depositing the removed third portion of the powder in a third collection container.

In another implementation, a method including depositing powder on a substrate at a powder deposition station, wetting the powder with a wetting agent at a wetting station, removing a portion of the wetting agent from the powder and depositing the removed portion of the wetting agent in a first collection container, depositing a binder to the powder, after wetting, at a binder jetting station, removing a portion of the binder from the powder and depositing the removed portion of the binder in a second collection container, depositing material ink to the powder, after the binder has been applied, and removing a portion of the material ink from the powder and depositing the removed portion of the material ink in a third collection container.

In a further implementation, a system including a powder deposition station configured to deposit powder on a substrate, a first powder removal station configured to remove a first portion of the powder from the substrate, a first collection container configured to receive the removed first portion of the powder, a wetting station configured to wet the powder on the substrate with a wetting agent, a second powder removal station configured to remove a second portion of the powder from the substrate after wetting, a second collection container configured to receive the removed second portion of the powder, a binder jetting station configured to deposit a binder to the powder on the substrate after the powder has been wetted by the wetting agent, a third powder removal station configured to remove a third portion of the powder, after depositing the binder, and a third collection container configured to receive the removed third portion of the powder.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

This disclosure provides an improved AM system, for example a 3D printing system, in which early portions of a 3D printing process is carried out on a continuous substrate, after which the substrate is cut into segments, each including a layer, formed of portions of printed powder, mounted thereon, the segments are each mounted on individual carrier frames, and the layers are subject to further processing while mounted on the carrier frames. Following this, the individual layers are transferred from the individual carrier frames to a stack of previously processed layers, on for example a build platform.

Figure 1:
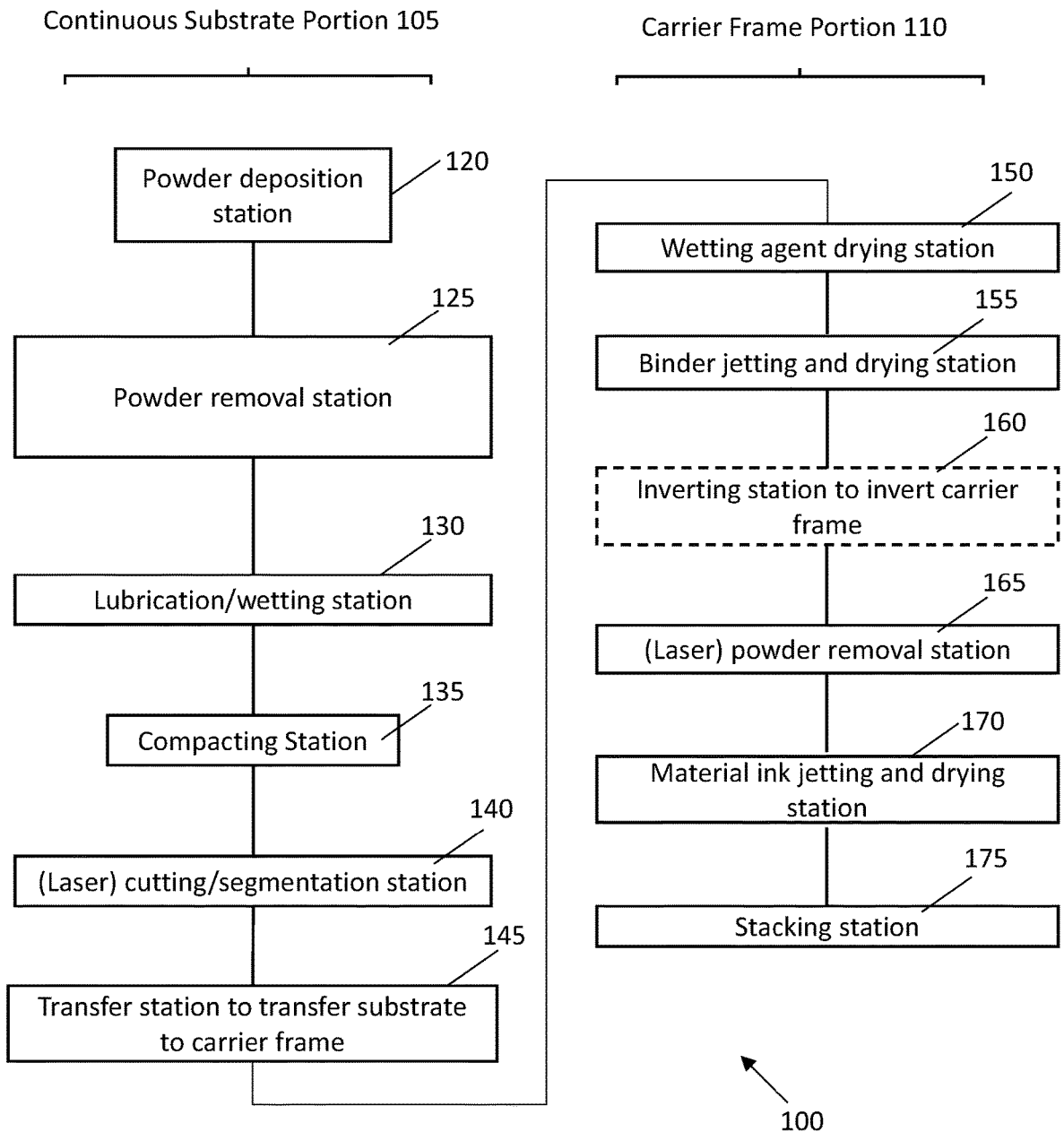
FIG. 1 shows an overall printing system for performing a portion of a printing process on a continuous substrate and a portion of the process carried out with substrate segments supported on carrier frames, in accordance with aspects of the present disclosure.

Referring to FIG. 1, an overall system 100 is shown for performing early portions of a 3D printing process 105 on a continuous substrate, and later portions 110 of the process with individual layers mounted on carrier frames. As can be seen in FIG. 1, the continuous substrate portion 105 of the system 100 includes a powder deposition station 120, where powder is deposited on a moving substrate, and a powder removal station 125, where powder is removed to create clean strips of the substrate separating adjacent sections of the powder which will become, in later stages of the process, layers of powder for stacking. The clean strips of the substrate will be used, at later stages of the process, for cutting the substrate into segments, each with a portion of the powder that will be formed into a powder layer for stacking. The continuous substrate portion of the system can also include a lubrication/wetting station 130, which wets the deposited powder with a wetting agent to prevent the powder from sticking to calendering rollers in a calendering or compacting station 135 which are used in the process to compact the wetted powder before further processing. This allows for achieving high packing density (e.g. greater than 30%) which otherwise cannot be achieved with typical AM systems. The continuous substrate can be formed of Mylar, for example, although other materials could be used.

Still referring to FIG. 1, the next station in the system can be a (laser) cutting/segmentation station 140 which cuts the substrate into segments for further processing individually as layers on the segments, rather than processing of adjacent portions of powder on a continuous substrate. Although FIG. 1 shows that the cutting station 140 uses laser cutting, other cutting techniques could be used, if desired.

Still referring to FIG. 1, later stages 110 of the 3D printing process are performed following transferring the individual substrate segments to corresponding individual carrier frames at a transfer station 145. Appropriate carrier frames for this purpose are described in a related application by the Applicant (U.S. application Ser. No. 18/074,298), entitled "Carrier Plate and Method of Use Thereof," filed on Dec. 2, 2022, and which is hereby incorporated by reference. After segmenting, the wetting agent applied at the lubrication/wetting station, can be removed in a wetting agent drying station 150. Next, the sections of the layers on the substrate segments can be passed to a binder jetting and drying station 155 at which binder is applied to the individual layers of the powder on the substrate segments, followed by drying the binder at the same station. Alternatively, the binder jetting can take place at one station, and the drying of the binder can be performed at another station further down the processing line.

In the implementation shown in FIG. 1, before further processing, the carrier frame is inverted in an inverting station 160 which turns the carrier frame 180 degrees so that the layer(s) of powder mounted on the carrier frames are suspended upside down from the corresponding substrate segment mounted on the carrier frame. In this manner, loose/non-compacted powder is influenced away from the substrate. In the implementation shown in FIG. 1, after inversion of the carrier frames at the inverting station, excess powder or non-patterned portions of powder (i.e., powder which has not been subject to the binder jetting) can be removed at a (laser) powder removal station 165. A related application by the Applicant (U.S. application Ser. No. 18/152,854), entitled "Method and Apparatus for Powder Removal in an Additive Manufacturing System," filed on Jan. 11, 2023, and which is hereby incorporated by reference, describes features of a laser powder removal station for this purpose. In other implementations, inversion of the carrier frame may not be required, or alternative methods to remove the non-patterned portions of powder may be utilized.

Finally, after removal of the excess powder, the carrier plates, with substrate segments having individual layers of compacted and patterned powder thereon, are passed to other processing stations, such as for example, a material ink jetting and drying station 170. In some implementations, the carrier frame may be inverted by 180 degrees so that the layer of powder that is being processed is facing up. In alternative implementations, the steps of ink jetting and drying can be performed in two separate stations. Finally, the inverted carrier plates are passed to a stacking station 175 where the individual layers of powder, which have been fully processed, are removed to be placed on a stack of previously processed layers of powder to form a final product, on for example a build platform. A suitable procedure for removing the individual layers from their respective carrier plates is described in the above-noted related application by the Applicant (U.S. application Ser. No. 18/074, 298) and in another related provisional application by the Applicant (U.S. Provisional Application No. 63/299,863), entitled "Method and Apparatus to Process and Bond Layers in an Additive Manufacturing System," filed on Jan. 14, 2022, and which is hereby incorporated by reference.

Although FIG. 1 shows an implementation of a system for performing a 3D printing process partially using a continuous substrate and partially using segments of the substrate mounted on carrier frames, the specific steps performed using the continuous substrate and the steps performed using the substrate segments mounted on carrier frames can be changed. For example, in an alternative implementation, the substrate segments, with their respective layers of powder, can undergo operations at the wetting agent drying station and the binder jetting and drying station before proceeding to be mounted on the carrier frames. Alternatively, the cutting and segmentation station can be located at a later point in the overall system. Additionally, any number of processing steps can be performed on any of the substrate segments, in any order.

Figure 2:
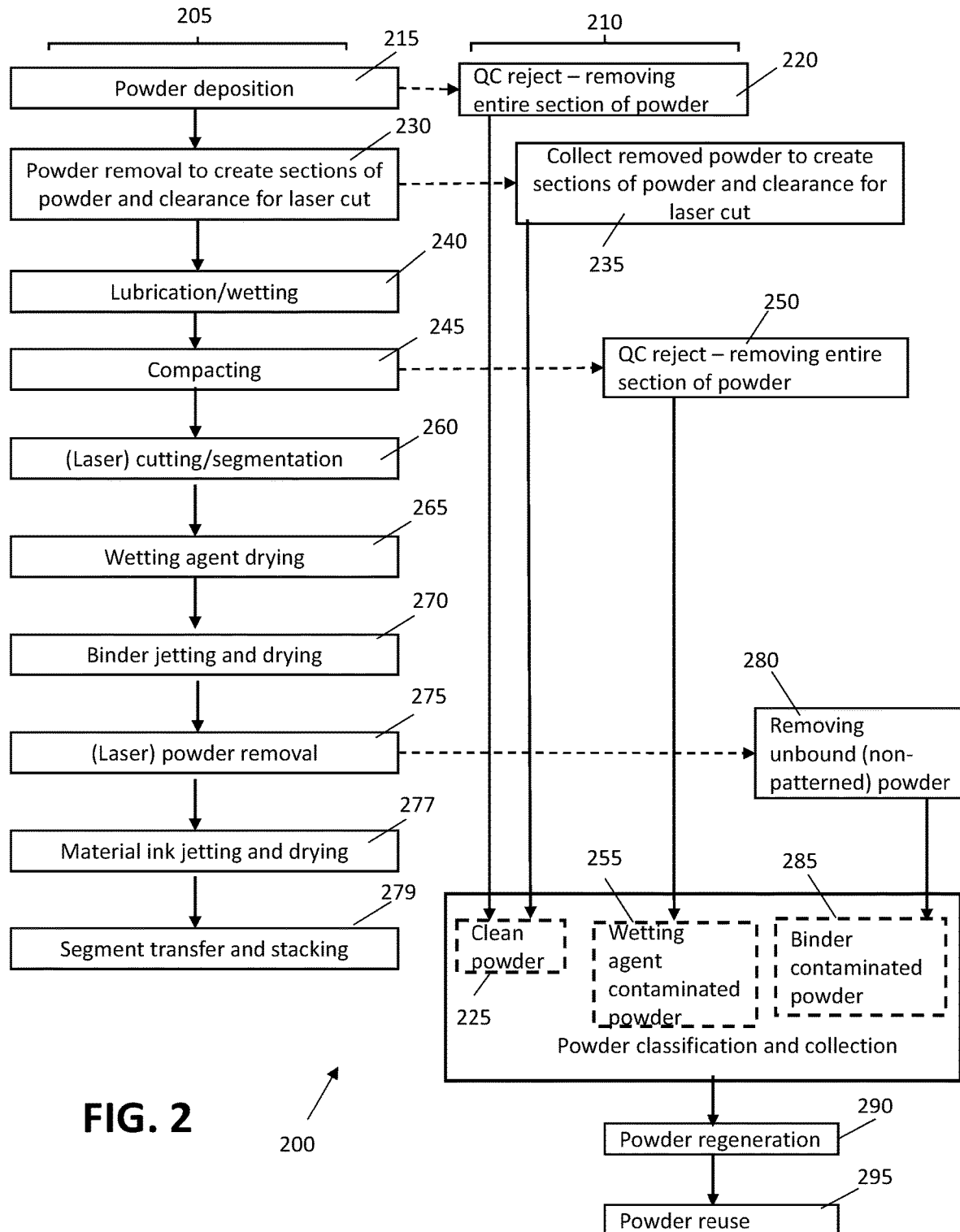
FIG. 2 shows an overall flow chart of a printing process using powder deposited on a substrate, including in-situ powder collection and regeneration, in accordance with aspects of the present disclosure.
Figure 4:
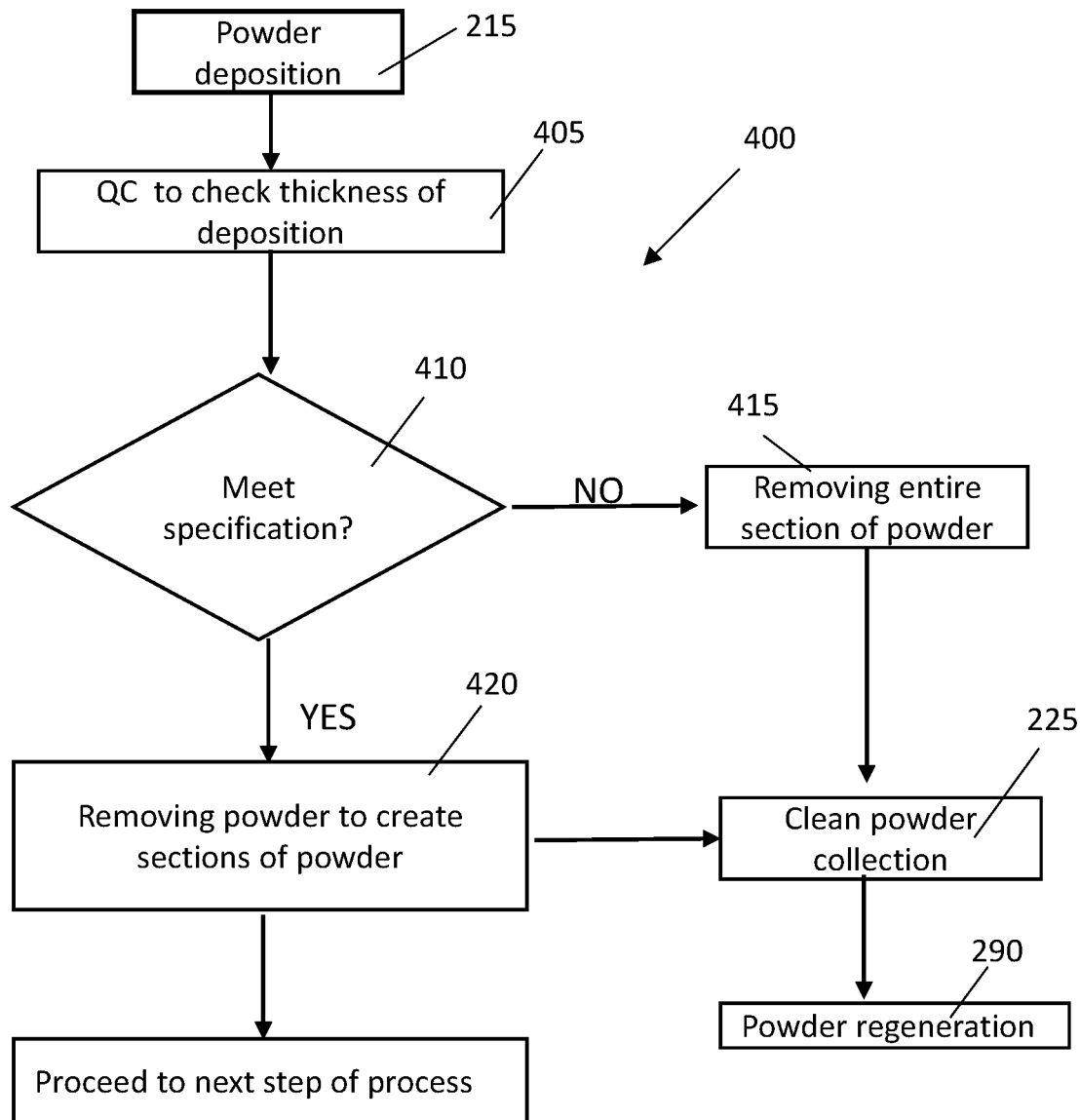
FIG. 4 shows a method of in-situ clean powder collection and regeneration in early stages of the printing system using powder deposition shown in FIG. 2, in accordance with aspects of the present disclosure.
Figure 5:
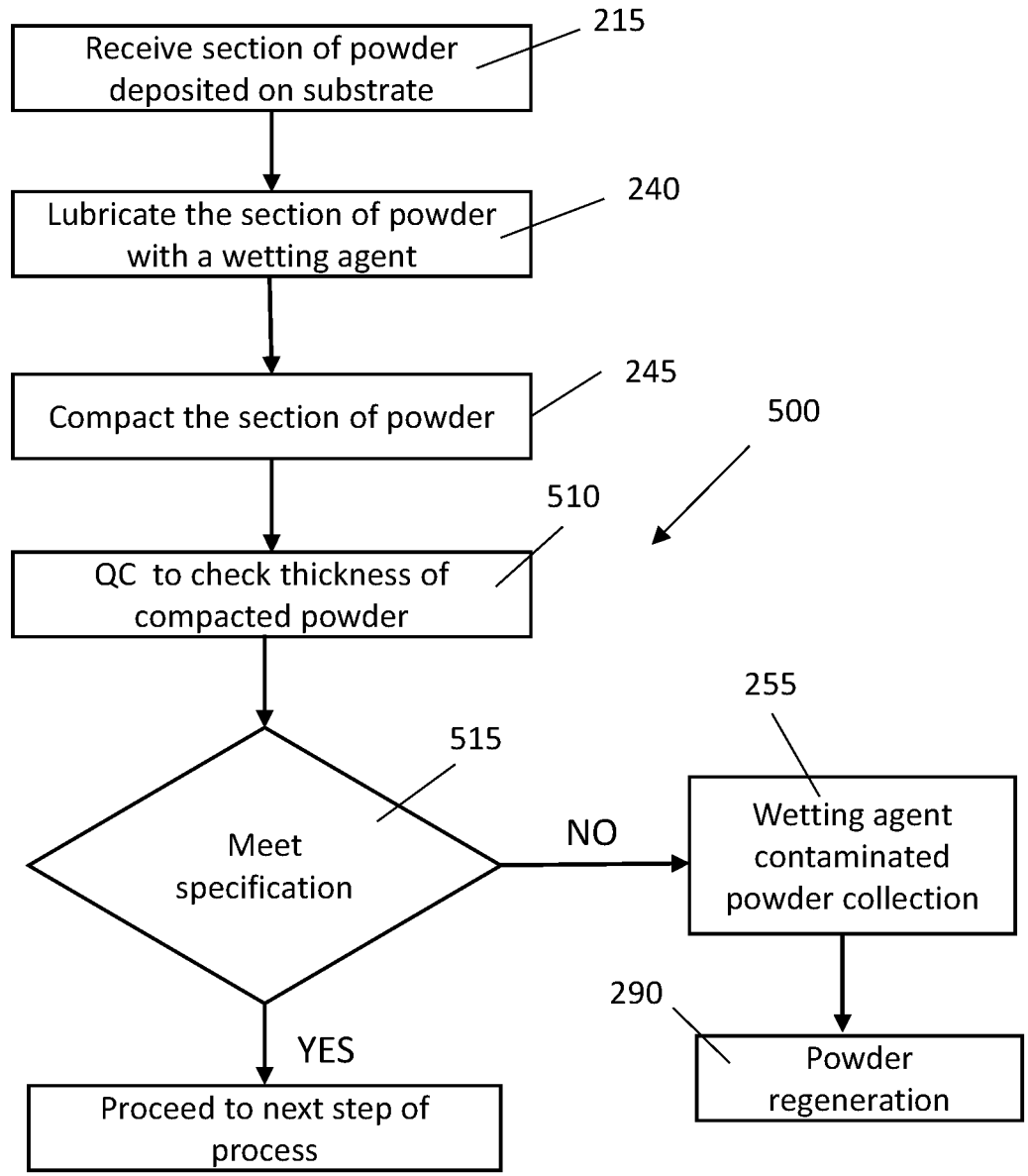
FIG. 5 shows a method of in-situ wetting agent contaminated powder collection and regeneration in middle stages of the printing system using powder deposition shown in FIG. 2, in accordance with aspects of the present disclosure.
Figure 6:
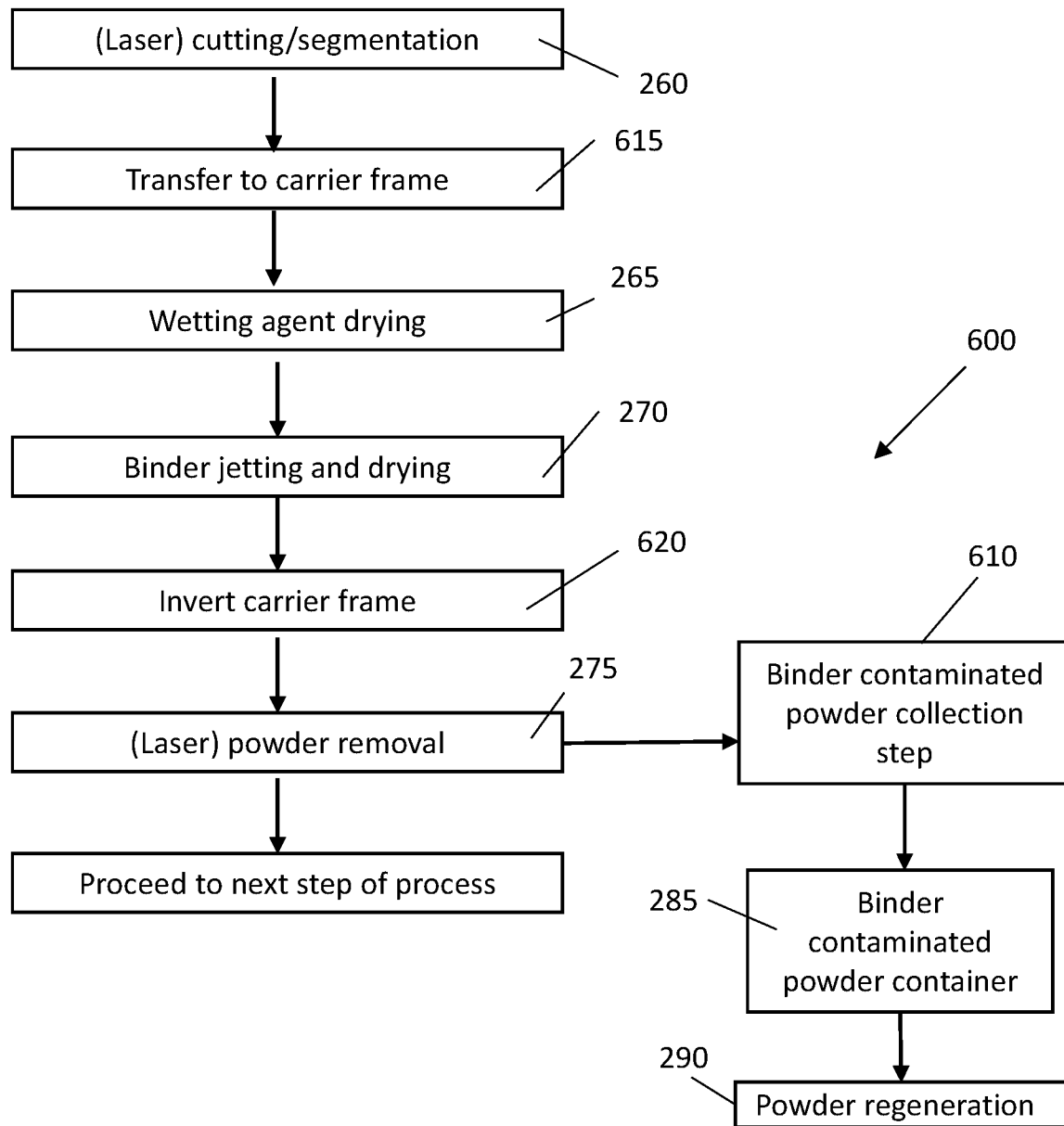
FIG. 6 shows a method of in-situ binder contaminated powder collection and regeneration in final stages of the printing system using powder deposition shown in FIG. 2, in accordance with aspects of the present disclosure.
Figure 9:
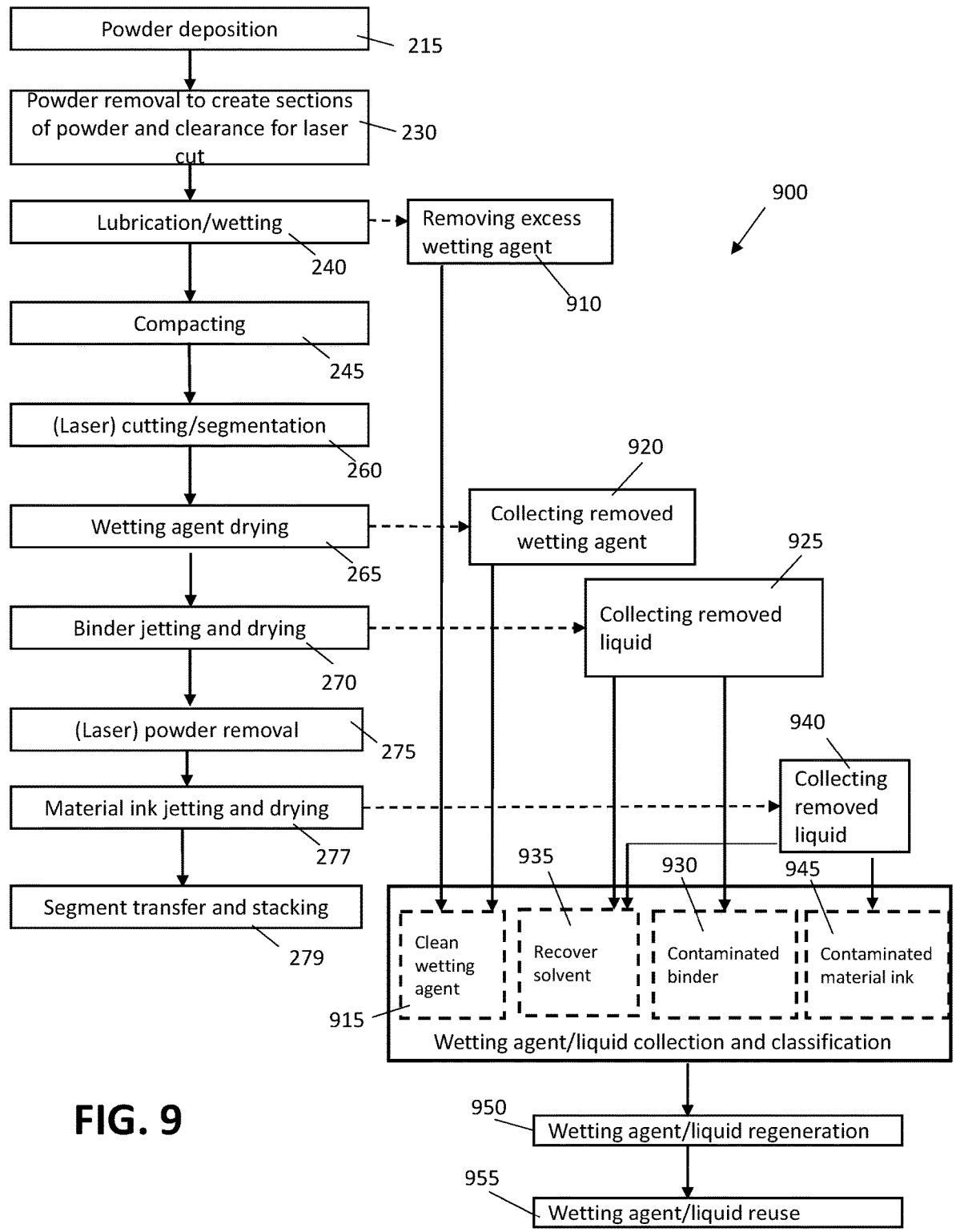
FIG. 9 shows an overall flow chart of a printing process using powder deposited on a substrate, including in-situ wetting agent/liquid collection and regeneration, in accordance with aspects of the present disclosure.

This disclosure also provides an improved AM method and system, for example a 3D printing system, including an in-situ material regeneration system, the material regeneration comprising powder and/or liquid regeneration. The left side of FIG. 2 shows a flowchart of steps for an AM process in conjunction with a powder regeneration arrangement. FIG. 9 shows a flowchart of an AM process in conjunction with a liquid regeneration arrangement. Specifically, FIG. 2 shows an example of a 3D printing system and process 200 using powder deposition on a moving substrate for a series of initial steps of the printing process, followed by cutting of the substrate into segments and mounting the segments, each with a layer of deposited powder thereon, onto individual carrier frames, for the remaining steps of the printing process. More specifically, on the right side of FIG. 2, a flow chart is shown for a powder collection and regeneration process 210 to operate in conjunction with the 3D printing process 205 shown in the left side of FIG. 2. Dashed arrow lines show points in the 3D printing process 205 where powder is collected for regeneration by the regeneration process 210, in accordance with aspects of the present disclosure. It is noted that these portions of powder that are collected at the steps 220, 235, 250 and 280 can be partial portions of the powder or all of the powder (e.g., the entire section of powder) existing at the time of removal (including powder that has been treated with a wetting agent, binder or ink, and which, accordingly, is no longer just powder). In other words, any portion of the powder between 0%-100% remaining at the time of collection can be collected in accordance with the present disclosure. FIGS. 4-6 show more detailed flowcharts of the 3D printing process steps of FIG. 2, and specific points in the 3D printing process where powder (either clean powder or contaminated powder, depending on the stage of processing) is collected for regeneration.

The regeneration method and system 210 shown on the right side of FIG. 2 enables recovery, reconditioning and reuse of used powder, regardless of whether the powder is clean or contaminated. According to this disclosure, and as illustrated in FIG. 2, used clean powder can be first collected after powder deposition 215 following quality control rejection 220. Quality control may include, for example, the height or thickness of the deposited powder, removing any excess powder deposited. In this instance, a first portion of powder is removed, which is clean powder, powder that has not yet been "contaminated" by any lubricant, wetting agent, binder, material ink, solvent, or other substance. The clean powder (e.g., a first portion of powder) is stored in a first collection container, a clean powder container 225 of a classification system, as shown in FIG. 2. Further, during powder removal 230 (via, for example, the first powder removal station) to create sections of powder (segmenting the powder into adjacent layers of powder, separated by clean portions of the substrate to be used for cutting later in the manufacturing process as described below with regard to FIG. 6), the used clean powder, which may also be consider a first portion of the powder is collected (step 235) and is stored in the clean powder container 225. The removal, collection and regeneration of clean powder is further discussed below with regard to FIG. 4.

Still referring to FIG. 2, in step 240 used powder that has been contaminated with a wetting agent, referred to as a second portion of the powder can also be removed (via, for example, the second powder removal station) and collected after a compacting process 245, following quality control rejection 250, and is stored in a second collection container, a wetting agent contaminated powder container 255. This is discussed below with regard to FIG. 5. Later in the printing process 205 after a laser cutting/segmentation step 260, a wetting agent drying step 265, and a binder jetting and drying step 270 (similar to the steps 140, 150 and 155 in FIG. 1), during a (laser) powder removal process 275 (similar to step 165 in FIG. 1), a third portion of powder, which is used unbound powder that has been contaminated by binder is removed (via, for example, the third powder removal station) and collected in step 280, and is then stored in a third collection container, the binder contaminated powder container 285 for regeneration (step 290) and powder reuse (step 295). The printed layers on the substrate segments go on with material (ink) jetting and drying 277 and segment transfer and stacking 279. The removal, collection and regeneration of binder contaminated powder is further discussed below with regard to FIG. 6. It is again noted that each of the first, second and third portions of powder referred to above can be partial portions of the powder or all of the powder (e.g., the entire section of powder) existing at the time of removal. It is also noted that the first, second and third powder removal stations may be separate modules or may be integrated with other process modules of the system.

Following powder collection and classification at the various stages described above with reference to FIG. 2, the collected powder is reconditioned by a powder regeneration system (step 290) and can be fed back for reuse (step 295) in the process steps 205 shown on the left side of FIG. 2. Regeneration of the powder in step 290 may be accomplished, for example, by sieving, drying, burn-out, high temperature treatment, and spray dry processes. Further, the type of regeneration depends on whether the powder is clean, contaminated by a wetting agent, or contaminated by a binder material, as will be discussed in further detail below. One or more of the regeneration steps may be carried out in-situ, or at locations remote from the printing system.

Figure 3:
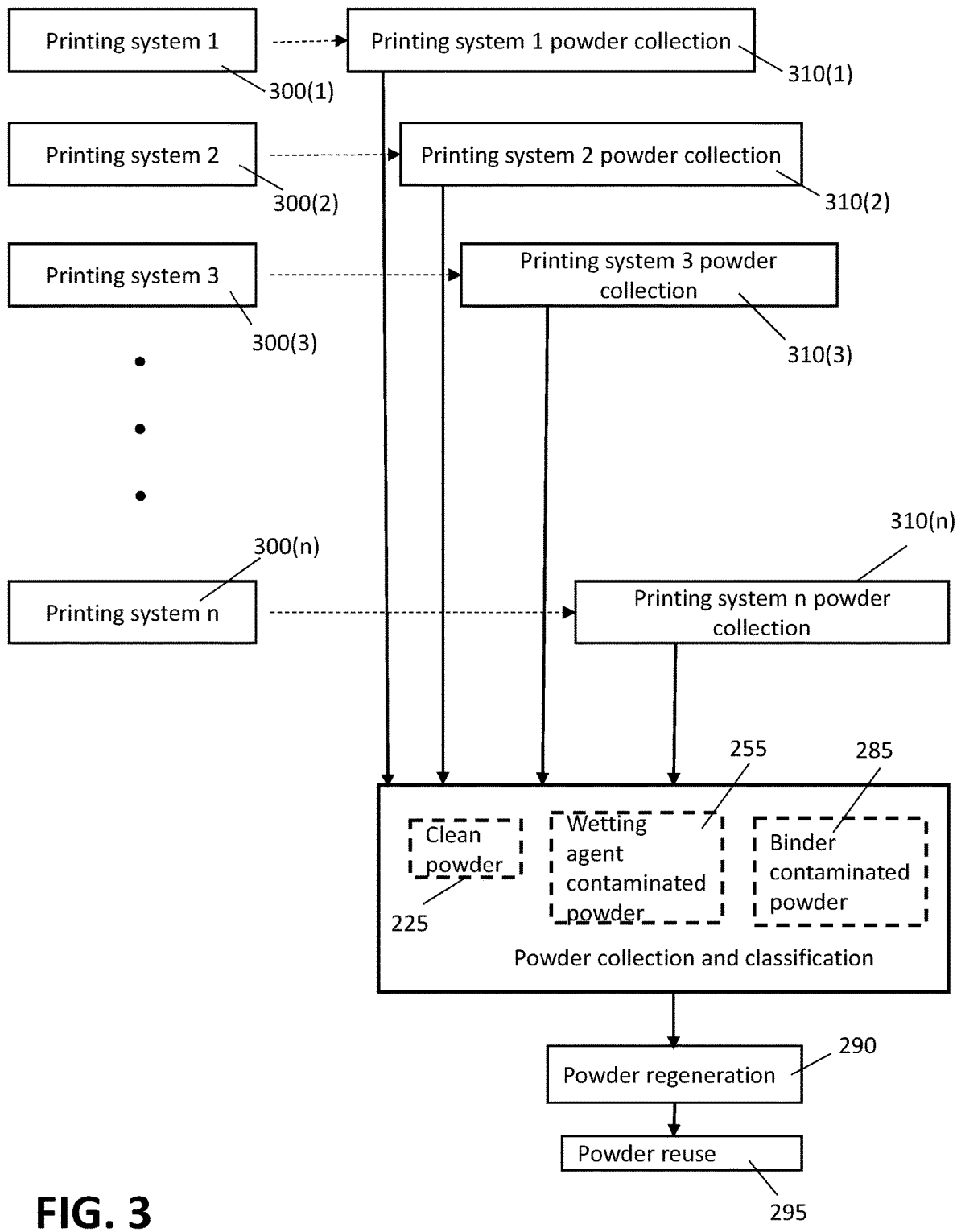
FIG. 3 shows a flow chart of an in-situ powder collection and regeneration method for multiple printing systems using powder deposition, in accordance with aspects of the present disclosure.

In another implementation, as illustrated in FIG. 3, multiple 3D printing systems 300(1), 300(2), 300(3) . . . 300(n) can be employed in a 3D printing manufacturing, or other type of AM process. Used powders are collected from each printing system (steps 310(1), 310(2), 310(3) . . . 310(n), respectively), stored in centralized classified powder storage containers for clean powder, wetting agent contaminated powder and binder contaminated powder (225, 255 and 285, respectively), reconditioned or regenerated by the centralized powder regeneration system (step 290), and fed back to each printing system for reuse (step 295).

FIG. 4 shows a process 400 for clean powder collection and regeneration at an early point in the 3D printing process 205 shown in FIG. 2. In particular, as illustrated in FIG. 4, clean powder is collected after the powder deposition step 215. The thickness of the deposited powder is then checked in a quality control step (QC) 405. In step 410, if the deposited powder layer fails in this quality control inspection by not being with a predetermined thickness range, the entire powder layer is removed (step 415) and sent to the clean powder container 225. At this point, the process of FIG. 2 would return to depositing a new layer of powder (which can be drawn, if desired, from the clean powder container 225 shown in FIG. 2 and FIG. 4).

As also shown in FIG. 4, clean powder is also collected in step 420 during powder removal by vacuum from a nozzle arrangement, for example, which is used to create clean sections of the substrate free from powder. These clean sections of the substrate can be used to cut the substrate without disrupting the deposits of powder on the substrate, to create segments of the substrate, as will be discussed below. A suitable 3 nozzle arrangement for creating these clean sections is discussed in a related application by the Applicant (U.S. application Ser. No. 18/074,173), entitled "Apparatus and Method to Remove Powder with Flexible Scraper Blade and Adjustable Side Nozzles," filed on Dec. 2, 2022, and which is hereby incorporated by reference.

The clean powder from the clean powder containers of FIG. 2 or 3 may be directly fed back for reuse. In some implementations, the clean powder is blended with virgin powder before sent back for reuse. In other implementations, the clean powder is reconditioned or regenerated by sieving, e.g., ultrasonic sieving if powder agglomeration occurred during printing. In other implementations, if there is significant moisture uptake in the powder during printing, the clean powder is reconditioned first by low temperature (e.g., <300° C.) drying using a convection or vacuum oven, followed by sieving to remove possible large agglomerates formed from drying. In still other implementations, if the powder reacts with components of air, e.g., carbon dioxide, to form a carbonate byproduct, the clean powder is then reconditioned by high temperature (e.g., >300° C.) treatment to purify the powder by decomposing the carbonate byproduct.

In other cases, there may be a significant increase in powder particle size and change in powder particle shape caused by partial sintering from high temperature treatment. In this case, the high temperature treated powder is reconditioned by grinding or milling to reduce the particle size. Milling techniques for particle size reduction may include air classifying mills, pin mills, hammer mills, jet mills, and ball mills. After milling, the high temperature treated powder is further reconditioned to restore particle shapes. For example, the high temperature treated and milled powder is further processed by spray drying to restore the spherical shape. One or more of these reconditioning methods can be applied consecutively or concurrently depending upon the complexity of reconditioning required.

FIG. 5 shows a process 500 for collection and regeneration of wetting agent contaminated powder after the powder has been wetted in a wetting station (e.g., 130 of FIG. 1) in the process step 240 shown in FIG. 2. In this implementation, as illustrated in FIG. 5, powder is collected after a compacting step 245, for example a calendering step, which occurs after the powder has been wetted to improve the calendering operation. Specifically, as discussed above with regard to FIG. 2 and in a related application by the Applicant (U.S. application Ser. No. 18/074,236), entitled "Apparatus and Method to Provide Conditioning to a Deposited Powder," filed on Dec. 2, 2022, and which is hereby incorporated by reference, the powder is wetted to reduce undesirable sticking of the powder to the calendering rollers. The purpose of the calendering step 245 is to compact the powder and to provide a uniformly thick compacted powder. This allows for achieving high packing density (e.g. greater than 30%) which otherwise cannot be achieved with typical AM systems. As shown in FIG. 5, the thickness of the compacted powder layer following passing the powder layer through the calendering rollers is then checked in a second quality control (QC) step 510. If the compacted powder layer fails in this quality control inspection to meet specifications (step 515), for example, if the thickness of the compacted powder layer does not fall within a second predetermined range, the entire powder layer is removed and sent to the wetting agent contaminated powder container 255. If step 515 determines that the thickness is within a predetermined range, then the compacted powder layer is passed on to the next steps of process shown in FIG. 2.

In some implementations, the collected wetting agent contaminated powder is reconditioned or regenerated in step 290 by sieving, e.g. ultrasonic sieving, blended with virgin powder, and then sent back to the process shown in FIG. 2 for reuse. In other implementations, the wetting agent contaminated powder is reconditioned first by low temperature (e.g. <300° C.) drying to remove the wetting agent and then by sieving to remove possible large agglomerates formed from drying. One or more of these reconditioning methods can be applied consecutively or concurrently depending upon the complexity of reconditioning required.

FIG. 6 shows a process 600 for collection and regeneration of the binder contaminated powder collected in a step 610 at a later stage of the 3D printing process 210 shown in FIG. 2. In one implementation, as illustrated in FIG. 6, powder is collected in step 610 during a (laser) powder removal process 275 and stored in the binder contaminated powder container 285. As also shown in FIG. 6, prior to the (laser) powder removal 275, the substrate, on which powder has been deposited, is cut in step 260 at the cleaned areas discussed above regarding FIGS. 2 and 4, to create individual substrate segments, each with a layer of compacted powder thereon. After cutting, the substrate segments are transferred to carrier frames in step 615. The powder layers on the individual substrate segments are then dried to remove any remaining wetting agent in step 265 (that was applied, as discussed above regarding FIG. 5 to reduce sticking of the powder to the rollers in the calendering operation).

Each substrate segment is transferred to its own individual carrier frame in step 615 where it is secured in a locked position for further processing, such as for example, binder application and drying. Appropriate carrier frame systems for this purpose are discussed in the above-noted related application by the Applicant (U.S. application Ser. No. 18/074,298), which is hereby incorporated by reference. It is noted that each individual carrier frame can have a unique identifier (e.g., such as an RFID tag) correlating the carrier frame to the specific individual layer mounted thereon.

As also shown in FIG. 6, each individual carrier frame, with a substrate segment having a layer mounted thereon, can then be inverted in step 620 for purposes of separating the layer from its corresponding substrate segment in order to stack the layer on a stack of other layers to form a multilayer product. This is part of the "Segment transfer and stacking step" shown in FIG. 2. This removal process of the individual layers from the substrate segments mounted on respective carrier frames is also discussed in detail in the above noted related application by the Applicant (U.S. application Ser. No. 18/074,298).

During this inverting process of the carrier frames in step 620, some of the powder in the layers mounted on the respective carrier frames (which has been contaminated by the binder) may fall off. Other binder contaminated powder will be removed in the (laser) powder removal process 275, as discussed in the above-noted related applications by the Applicant (U.S. application Ser. No. 18/074,173 and U.S. Provisional Application No. 63/299,776). As shown in FIGS. 2 and 6, all of this removed binder contaminated powder is collected in the binder contaminated powder collection step 610 and deposited in a binder contaminated powder container 285 for powder regeneration.

In some implementations, the binder contaminated powder is reconditioned in step 290 by sieving, e.g. ultrasonic sieving, blended with virgin powder and then sent back to the process shown in FIG. 2 for reuse. In other implementations, the binder contaminated powder is reconditioned by high temperature (e.g. >300° C.) treatment to purify the powder by decomposing the binder. There may be a significant increase in powder particle size and change in powder particle shape caused by partial sintering from this high temperature treatment. In this case, the high temperature treated powder is reconditioned by grinding or milling to reduce the particle size. Milling techniques for particle size reduction may include air classifying mills, pin mills, hammer mills, jet mills, and ball mills. After milling, the high temperature treated powder is further reconditioned to restore particle shapes. For example, the high temperature treated and milled powder can be further processed by spray drying to restore the spherical shape of the powder particles. One or more of these reconditioning methods can be applied consecutively or concurrently depending upon the complexity of reconditioning required.

Figure 7:
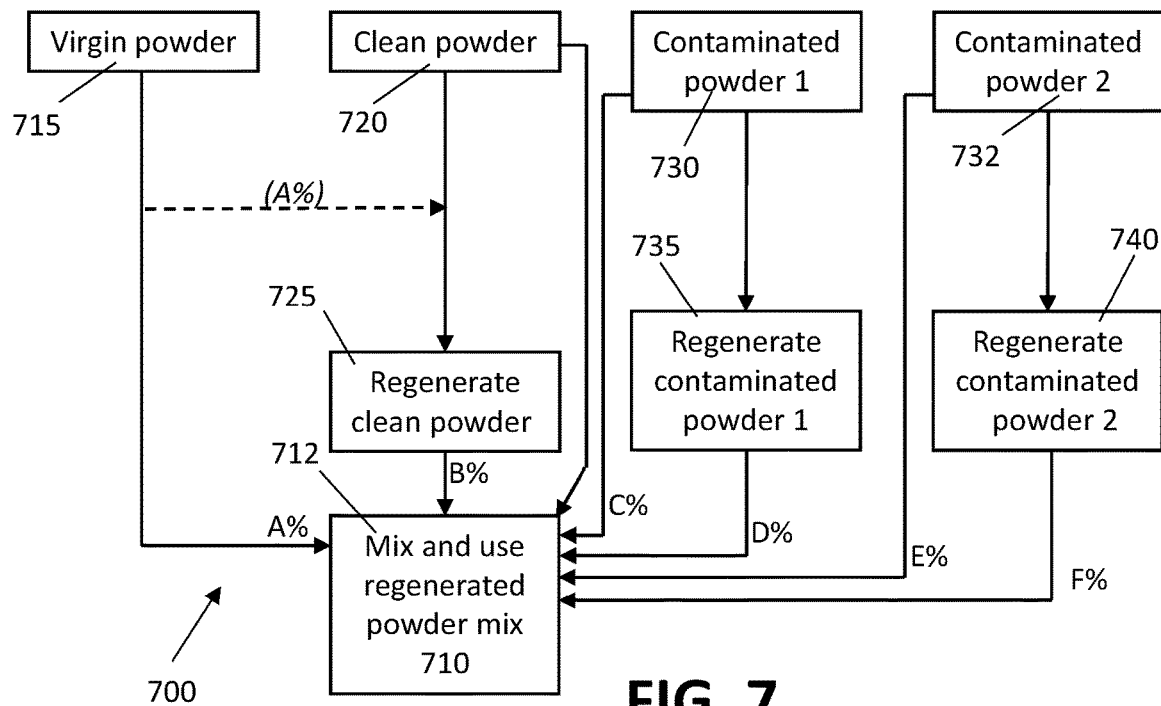
FIG. 7 shows a flow chart of a powder regeneration method for a printing system using powder deposition, in accordance with aspects of the present disclosure.

FIG. 7 shows an example of a process 700 for collecting powder from the various stages of the printing process described in FIG. 2, in order to create powder that can be used in subsequent printing processes. In particular, as illustrated in FIG. 7, a regenerated powder mix 710 is blended in step 712 for subsequent use. The regenerated powder mix 710 comprising a mix of one or more virgin powders 715, collected clean powder 720, regenerated clean powder 725, contaminated powder (1), 730, contaminated powder (2), 732 and regenerated contaminated powders 735 and 740 (for example contaminated powder (1) can be wetting agent contaminated powder and contaminated powder (2) can be binder contaminated powder). Virgin powder 715, that is, powder that has not yet been used or undergone processing in the printing process may be added to the collected clean powder 720 (that has been collected, for example, as described above with reference to FIG. 2) before it undergoes regeneration, or added directly to the regenerated powder mix 710. Although FIG. 7 shows only two types of contaminated powders 730 and 732, it will be apparent that any number of contaminated powders can be utilized, and the form of regeneration carried out will vary based on the process from which the contamination results.

There are numerous ways in which virgin powder 715, clean powder 720, regenerated clean powder 725, contaminated powders 730 and 732 and regenerated contaminated powders 735 and 740 can be combined to form a regenerated powder mix 710. For example, referring to FIG. 7, B % may be 100%, with 0% of virgin, contaminated or regenerated contaminated powder being used. In an alternative, C % and E % may both be 0%, with only virgin and regenerated powders being combined to form the regenerated powder mix. The values of A %, B %, C %, D %, E %, and F % may vary from 0-100%, the percentage representing the percentage of the regenerated powder mix. The percentage may be determined by the application for which the regenerated powder mix is to be used. In some instances, where a certain powder purity is desired, it may be required to use a minimum of 20%-30% virgin powder, 0% contaminated powder, and no more than 5% regenerated contaminate powders, for example.

Figure 8:
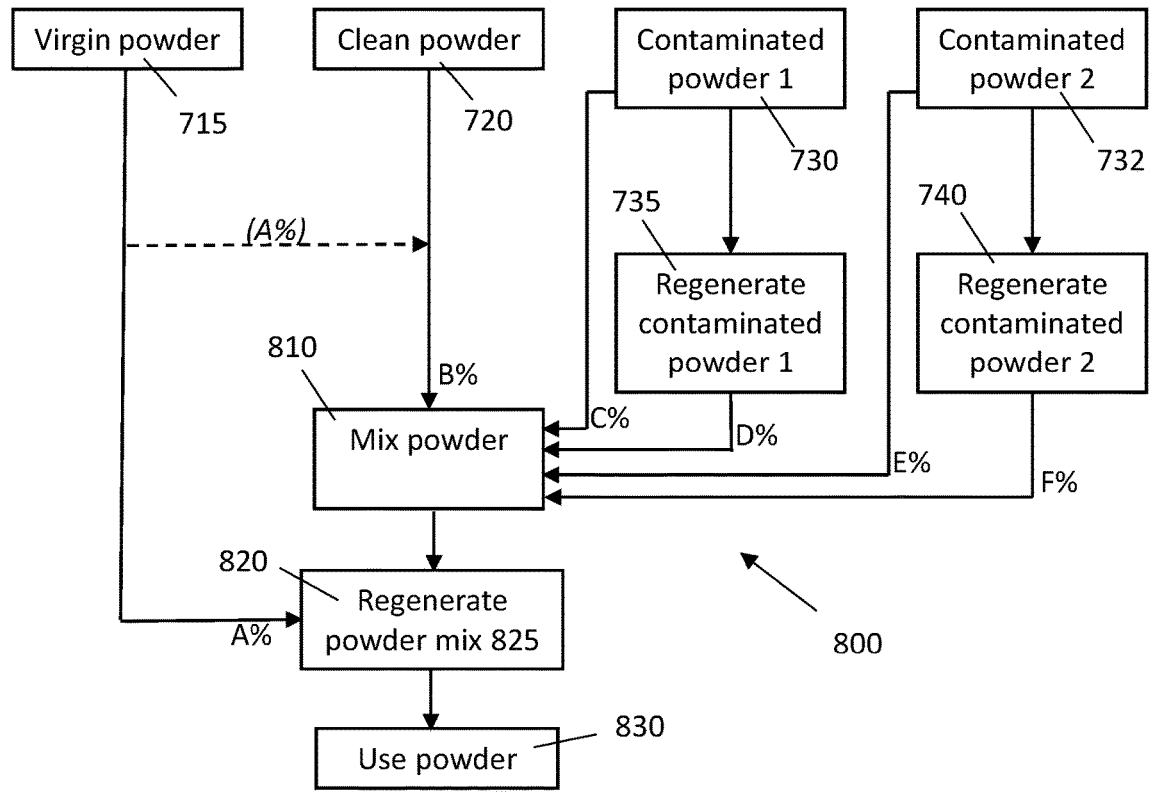
FIG. 8 shows a flow chart of an alternative powder regeneration method for a printing system using powder deposition, in accordance with aspects of the present disclosure.

FIG. 8 shows an example of an alternative process 800 for collecting powder from the various stages of the printing process described in FIGS. 2 and 7, in order to create powder that can be used in subsequent printing processes. In this embodiment, one or more portions varying in percentage from 0-100% of contaminated and regenerated contaminated powders are mixed or blended in step 810 with classified clean powder 720 (which, optionally, can be premixed with virgin powder 715), and subsequently the entire mixture undergoes a regeneration process in step 820 to form a regenerated powder mix 825 that can then be used in subsequent processes (step 830). As also shown in FIG. 8, a portion of virgin powder 715 can also be added to the regenerated powder mix 825 before using the combined powder in subsequent processes.

It will be apparent that though FIGS. 7 and 8 illustrate examples of the numerous ways in which virgin powder, clean powder, regenerated clean powder, contaminated powders and regenerated contaminated powders can be combined to form a regenerated powder mix, this same methodology may equally apply to the formation of regenerated liquid.

In some implementations, as illustrated in FIG. 9, an in-situ recycling system 900 for enabling recovery, reconditioning and/or reuse of the removed liquid may be included. The left side of FIG. 9 shows a flowchart of steps for an AM process using the step discussed above with reference to FIG. 2 (e.g., steps 215-279). On the right side of FIG. 9, a flow chart is shown for a wetting agent/liquid collection and regeneration process to operate in conjunction with the 3D printing process shown in the left side of FIG. 9. Dashed arrow lines show points in the 3D printing process where wetting agent/liquid is collected for regeneration, in accordance with aspects of the present disclosure.

In one implementation, the recovered liquid may be fed directly back and used by the printing system. In some implementations, the recovered liquid is collected and stored in a container before being fed back to reuse without any reconditioning. In some implementations, the recovered liquid is blended with virgin liquid before being fed back to reuse. During certain processes, different liquid mixtures may be created and stored in classified liquid storage containers. For the purpose of proper functioning, the liquid mixtures will need to be purified or regenerated by additional processes. For example, wetting agent being used for lubrication/wetting that becomes contaminated with powder will need to be cleaned by suitable methods, e.g., by filtration to remove the powder contaminant prior to reuse. In a similar fashion, liquid that becomes contaminated with binder or printing inks become contaminated with other materials will need to be purified prior to reuse.

Referring to FIG. 9, clean excess wetting agent can be collected in process 910 during the lubrication/wetting process 240 and stored in a first collection container, a clean wetting agent container 915. Excess vapor and/or condensed liquid may be collected in step 910 from the wetting station with the aid of, for example, hydrophilic material, which provides a mechanism for the condensed water to be transported via one or more ports on a lower portion of the wetting station to the wetting agent storage receptacle 915.

Similarly, excess wetting agent can be collected in step 920 during the drying stage 265 of the printing process and stored in the same clean wetting agent container 915. During binder jetting operation 270, excess liquid binder may be collected in step 925 from the binder jetting station with the aid of, for example, vacuum and/or differential pressure through a semi-permeable membrane and stored in a second collection container, a contaminated binder container 930. The collected liquid from binder jetting may contain various resin binders including monomer, polymer, and curing agent, solvents, and powder contaminant, and may be collected in contaminated binder container 930. Additional solvents can be collected during a drying operation performed on the deposited binder in the same binder jetting station or in a separate drying station, and stored in a fourth collection container, a recover solvent container 935.

Still referring to FIG. 9, during material (ink) jetting operation 277, any excess ink can be collected in process 940. In addition, used ink can be collected following quality control rejection (not shown). Solvents contained in the deposited ink can be collected during drying operation performed on the deposited ink in the same material (ink) jetting station or in a separate drying station, and stored in recover solvent container 935, which may be the same or different from the container used for solvents recovered from binder jetting and drying operations. In some implementation, liquid removal operation may be performed on the deposited ink with the aid of, for example, vacuum and/or differential pressure through a semi-permeable membrane to accelerate the drying process. The excess ink and used ink collected from the material (ink) jetting operation 277 and liquid collected from liquid removal operation 940 may be stored in separate containers, or combined into a mixture, which is stored in a third collection container, a contaminated material ink container 945. The mixture may contain the jetted material, such as metals, ceramics and polymers, binders including monomer, polymer, and curing agent, solvents, and powder contaminant. Following storage of the various liquids in the collection containers 915, 930, 935 and 945, the collected liquids can be regenerated in step 950 and then reused in step 955.

There are numerous methodologies that may be utilized in order to implement the liquid regeneration process 900. For example, the process 900 can involve a filtration to remove solid material, such as a powder from a liquid. In another example, distillation or vaporization may be applied to separate liquids, such as solvents from a solid particulate in a heterogeneous mixture. The distillation may also be applied to separate a liquid, such as a solvent from a solute in a homogeneous mixture. In addition, distillation can be used to separate solvents contained in a liquid after the separation from a solid.

In the above cases, the separation occurs because of differences in the physical properties of the respective components, and in particular, the heat of vaporization. A solid-liquid based purification methodology, such as column chromatography, ion-exchange chromatography, or other similar chromatographic method may be utilized. This may include one or more additional steps such as centrifugation, or selective adsorption using additives such as high surface area carbon, molecular sieves and other suitable adsorbing materials, where one particular component in the mixture has a higher affinity for the additive and is subsequently filtered to separate the component upon absorption to the additive. Alternatively, or additionally, a liquid-liquid based purification methodology may be employed, to separate the components of the mixture based on their solubilities in two liquids, such as two or more solvents.

In another example, the mixtures might be treated with some additional materials, such as a chemical compound or an additive designed to induce crystallization or induce a chemical reaction that enables selective purification of one component in the said mixture. Alternatively, or additionally, the mixture may be treated with other methods, such as thermal decomposition or electrolysis where one component undergoes some chemical transformation that enables the separation.

In some implementations, chemical composition analysis is performed on the recovered liquid to determine if reconditioning or regeneration is required to restore the composition of the liquid. In some implementations, the recovered liquid is regenerated by replenishing the components that are consumed in the printing process. When multiple printing stations or systems are employed, the recovered liquid from each printing station or system is collected mixed and stored in a container, the mixed liquid in the container is fed back for reuse by one or more of the multiple printing stations.

It is noted that although the above description has primarily been presented in terms of removing and regenerating powder or liquid on a substrate with a deposited layer in the environment of additive manufacturing, such as 3D printing, the method and system of this disclosure is not limited to only such methods and systems, and could be used in any situation where it is desired to remove and regenerate powder and/or liquid from a substrate with deposited layers mounted thereon.

It is also noted that, although specific examples of processing steps for a 3D printing operation have been illustrated and discussed, the order of the processing steps could be changed, if desired, and/or additional processing steps could be added prior to final stacking of the layers. For example, the substrate could be segmented and the layers on the substrate could be transferred to the carrier frames earlier in the overall process, if desired. Also, the binder could be applied to the layers on the segments of the substrate before the segments have been mounted on the carrier frames. Also, the layers could be compacted after being mounted on the carrier frames, or, following an initial compacting, as described above, further compacting could be performed once the layers are mounted on the carrier frames.

In the following, further features, characteristics and advantages of the instant application will be described by means of items:

Item 1: A method including depositing powder on a substrate at a powder deposition station, removing a first portion of the powder and depositing the removed first portion of the powder in a first collection container, moving the powder remaining on the substrate to a wetting station, wetting the powder with a wetting agent at the wetting station, removing a second portion of the powder, after wetting, and depositing the removed second portion of the powder in a second collection container, moving the powder, after wetting and removal of the second portion, to a binder jetting station and depositing a binder to the powder at the binder jetting station, and removing a third portion of the powder, after depositing the binder, and depositing the removed third portion of the powder in a third collection container.

Item 2: The method of item 1, wherein the wetting agent is removed at a drying station prior to moving the powder to the binder jetting station.

Item 3: The method of item 1 or 2, wherein the first collection container is a clean powder collection container, the second collection container is a wetting agent contaminated powder collection container, and the third collection container is a binder contaminated powder collection container.

Item 4: The method of any of items 1-3, further comprising regenerating the powder from each of the first, second and third collection containers for reuse.

Item 5: The method of any of items 1-4, wherein a first regeneration process is used for in-situ regenerating powder from the first collection container, a second regeneration process is used for in-situ regenerating powder from the second collection container, and a third regeneration process is used for in-situ regenerating powder from the third collection container, wherein each of the first, second and third regeneration processes is different from the other two regeneration processes.

Item 6: The method of any of items 1-5, wherein the first, second and third collection containers are used to collect powder from a plurality of different processing systems which each perform the steps recited in claim 1.

Item 7: The method of any of items 1-6, further comprising determining, following deposition of the powder, whether a thickness of the deposited powder falls within a predetermined range, and, based on determining that the thickness of the powder does not fall within the predetermined range, removing all of the powder and depositing the removed powder in the clean powder collection container.

Item 8: The method of any of items 1-7, further comprising, based on determining that the thickness of the powder does fall within the predetermined range, removing the first portion of the powder to create a clean section on the substrate free of powder between adjacent sections of the powder on the substrate that have powder deposited there on.

Item 9: The method of any of items 1-8, further comprising, following wetting of the powder at the wetting station, passing the powder through calendering rollers to compact the powder.

Item 10: The method of any of items 1-9, further comprising determining, following compacting of the powder by the calendering rollers, whether a thickness of the compacted powder falls within a second predetermined range, and, based on determining that the thickness of the powder does not fall within the second predetermined range, removing all of the powder and depositing the removed powder in the second collection container.

Item 11: The method of any of items 1-10, further comprising, based on determining that the thickness of the powder does fall within the second predetermined range, cutting the substrate at the clean section of the substrate on one side of the compacted powder and at another clean section of the substrate on an opposite side of the compacted powder to create a segment of the substrate having a layer of compacted powder thereon, and passing the segment of the substrate to the binder jetting station.

Item 12: The method of any of items 1-11, further comprising, transferring and securing the segment of the substrate to carrier frame, inverting the carrier frame, collecting loose binder contaminated powder following inverting of the carrier frame, and depositing the loose binder contaminated powder in the third collection container.

Item 13: The method of any of items 1-12, further comprising regenerating each of the removed first, second and third portions of powder separately and mixing the regenerated first, second and third portions of powder.

Item 14: The method of any of items 1-13, further comprising mixing virgin powder with the removed first portion of powder prior to regenerating the removed first portion of powder.

Item 15: The method of any of items 1-14, further comprising mixing virgin powder with the mixed regenerated first, second and third portions of powder.

Item 16: The method of any of items 1-15, further comprising mixing the removed first, second and third portions of powder and regenerating the mixed first, second and third removed portions of powder.

Item 17: The method of any of items 1-16, further comprising mixing virgin powder with the removed first portion of powder prior to regenerating the mixed removed first, second and third portions of powder.

Item 18: The method of any of items 1-17, further comprising mixing virgin powder with the regenerated mixed first, second and third portions of powder.

Item 19: A method including depositing powder on a substrate at a powder deposition station, wetting the powder with a wetting agent at a wetting station, removing a portion of the wetting agent from the powder and depositing the removed portion of the wetting agent in a first collection container, depositing a binder to the powder, after wetting, at a binder jetting station, removing a portion of the binder from the powder and depositing the removed portion of the binder in a second collection container, depositing material ink to the powder, after the binder has been applied, and removing a portion of the material ink from the powder and depositing the removed portion of the material ink in a third collection container Item 20: The method of item 19, further comprising compacting and drying the powder after removing the portion of the wetting agent from the powder, removing remaining wetting agent from the powder after being compacted and dried, and depositing the removed remaining wetting agent in the first collection container.

Item 21: The method of item 19 or 20, further comprising processing the removed portion of the binder to remove solvent from the binder and depositing the removed solvent in a fourth collection container.

Item 22: The method of any of items 19-21, further comprising processing the removed portion of the material ink to remove solvent from the material ink and depositing the removed solvent in a fourth collection container.

Item 23: The method of any of items 19-22, further comprising regenerating the removed liquids in the first, second and third collection containers.

Item 24: A system including a powder deposition station configured to deposit powder on a substrate, a first powder removal station configured to remove a first portion of the powder from the substrate, a first collection container configured to receive the removed first portion of the powder, a wetting station configured to wet the powder on the substrate with a wetting agent, a second powder removal station configured to remove a second portion of the powder from the substrate after wetting, a second collection container configured to receive the removed second portion of the powder, a binder jetting station configured to deposit a binder to the powder on the substrate after the powder has been wetted by the wetting agent, a third powder removal station configured to remove a third portion of the powder, after depositing the binder, and a third collection container configured to receive the removed third portion of the powder.

Item 25: The system of item 24, wherein the second powder removal station is comprised a quality control station configured to remove all of the powder on the substrate if the powder on the substrate fails a quality control test following wetting of the powder with the wetting agent.

Item 26: The system of item 24 or 25, wherein the quality control test comprises checking a thickness of the powder on the substrate following wetting of the powder with the wetting agent.

Item 27: The system of any of items 24-26, further comprising a compacting station located between the wetting station and the binder jetting station.

Item 28: The system of any of items 24-27, further comprising a cutting station configured to cut the substrate into segments following wetting of the powder at the wetting station to provide a plurality of substrate segments each having a section of powder located thereon.

Item 29: The system of any of items 24-28, further comprising a transfer station configured to transfer the substrate segments with the sections of powder to carrier frames.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The invention claimed is:

1. A method comprising:
   depositing powder on a substrate at a powder deposition station;
   removing a first portion of the powder and depositing the removed first portion of the powder in a first collection container;
   moving the powder remaining on the substrate to a wetting station;
   wetting the powder with a wetting agent at the wetting station;
   removing a second portion of the powder, after wetting, and depositing the removed second portion of the powder in a second collection container;
   moving the powder, after wetting and removal of the second portion, to a binder jetting station and depositing a binder to the powder at the binder jetting station; and
   removing a third portion of the powder, after depositing the binder, and depositing the removed third portion of the powder in a third collection container.

2. The method of claim 1, wherein the wetting agent is removed at a drying station prior to moving the powder to the binder jetting station.

3. The method of claim 1, wherein the first collection container is a clean powder collection container, the second collection container is a wetting agent contaminated powder collection container, and the third collection container is a binder contaminated powder collection container.

4. The method of claim 3, further comprising regenerating the powder from each of the first, second and third collection containers for reuse.

5. The method of claim 4, wherein a first regeneration process is used for in-situ regenerating powder from the first collection container, a second regeneration process is used for in-situ regenerating powder from the second collection container, and a third regeneration process is used for in-situ regenerating powder from the third collection container, wherein each of the first, second and third regeneration processes is different from the other two regeneration processes.

6. The method of claim 5, wherein the first, second and third collection containers are used to collect powder from a plurality of different processing systems which each perform the steps recited in claim 1.

7. The method of claim 3 further comprising determining, following deposition of the powder, whether a thickness of the deposited powder falls within a predetermined range, and, based on determining that the thickness of the powder does not fall within the predetermined range, removing all of the powder and depositing the removed powder in the clean powder collection container.

8. The method of claim 7, further comprising, based on determining that the thickness of the powder does fall within the predetermined range, removing the first portion of the powder to create a clean section on the substrate free of powder between adjacent sections of the powder on the substrate that have powder deposited there on.

9. The method of claim 1, further comprising, following wetting of the powder at the wetting station, passing the powder through calendering rollers to compact the powder.

10. The method of claim 9, further comprising determining, following compacting of the powder by the calendering rollers, whether a thickness of the compacted powder falls within a second predetermined range, and, based on determining that the thickness of the powder does not fall within the second predetermined range, removing all of the powder and depositing the removed powder in the second collection container.

11. The method of claim 10, further comprising, based on determining that the thickness of the powder does fall within the second predetermined range, cutting the substrate at the clean section of the substrate on one side of the compacted powder and at another clean section of the substrate on an opposite side of the compacted powder to create a segment of the substrate having a layer of compacted powder thereon, and passing the segment of the substrate to the binder jetting station.

12. The method of claim 11, further comprising, transferring and securing the segment of the substrate to carrier frame, inverting the carrier frame, collecting loose binder contaminated powder following inverting of the carrier frame, and depositing the loose binder contaminated powder in the third collection container.

13. The method of claim 1, further comprising regenerating each of the removed first, second and third portions of powder separately and mixing the regenerated first, second and third portions of powder.

14. The method of claim 13, further comprising mixing virgin powder with the removed first portion of powder prior to regenerating the removed first portion of powder.

15. The method of claim 13, further comprising mixing virgin powder with the mixed regenerated first, second and third portions of powder.

16. The method of claim 1, further comprising mixing the removed first, second and third portions of powder and regenerating the mixed first, second and third removed portions of powder.

17. The method of claim 16, further comprising mixing virgin powder with the removed first portion of powder prior to regenerating the mixed removed first, second and third portions of powder.

18. The method of claim 16, further comprising mixing virgin powder with the regenerated mixed first, second and third portions of powder.

19. A method comprising:
depositing powder on a substrate at a powder deposition station;
wetting the powder with a wetting agent at a wetting station;
removing a portion of the wetting agent from the powder and depositing the removed portion of the wetting agent in a first collection container;
depositing a binder to the powder, after wetting, at a binder jetting station;
removing a portion of the binder from the powder and depositing the removed portion of the binder in a second collection container;
depositing material ink to the powder, after the binder has been applied; and
removing a portion of the material ink from the powder and depositing the removed portion of the material ink in a third collection container.

20. The method of claim 19, further comprising compacting and drying the powder after removing the portion of the wetting agent from the powder, removing remaining wetting agent from the powder after being compacted and dried, and depositing the removed remaining wetting agent in the first collection container.

21. The method of claim 19, further comprising processing the removed portion of the binder to remove solvent from the binder and depositing the removed solvent in a fourth collection container.

22. The method of claim 19, further comprising processing the removed portion of the material ink to remove solvent from the material ink and depositing the removed solvent in a fourth collection container.

23. The method of claim 19, further comprising regenerating the removed liquids in the first, second and third collection containers.

* * * * *